(12) United States Patent
Ogawa

(10) Patent No.: US 11,648,929 B2
(45) Date of Patent: May 16, 2023

(54) HYBRID VEHICLE

(71) Applicant: TOYOTA JIDOSHA KABUSHIKI KAISHA, Toyota (JP)

(72) Inventor: Yuki Ogawa, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 122 days.

(21) Appl. No.: 17/460,706

(22) Filed: Aug. 30, 2021

(65) Prior Publication Data

US 2022/0126812 A1 Apr. 28, 2022

(30) Foreign Application Priority Data

Oct. 27, 2020 (JP) .............................. JP2020-179461

(51) Int. Cl.
| | | |
|---|---|---|
| *B60W 20/13* | (2016.01) | |
| *B60W 10/06* | (2006.01) | |
| *B60W 10/08* | (2006.01) | |
| *B60W 40/02* | (2006.01) | |

(52) U.S. Cl.
CPC ............ *B60W 20/13* (2016.01); *B60W 10/06* (2013.01); *B60W 10/08* (2013.01); *B60W 40/02* (2013.01); *B60W 2510/246* (2013.01); *B60Y 2200/92* (2013.01)

(58) Field of Classification Search
CPC ...... B60W 20/13; B60W 10/06; B60W 10/08; B60W 10/30; B60W 10/10; B60W 40/02; B60W 2510/246; B60W 2200/92; B60W 50/08; B60W 2050/146; B60W 2510/244; B60W 2510/305; B60W 2530/18; B60K 6/445

See application file for complete search history.

(56) References Cited

U.S. PATENT DOCUMENTS

| | | | | |
|---|---|---|---|---|
| 5,832,400 | A * | 11/1998 | Takahashi | ......... B60W 30/1819 701/53 |
| 10,065,631 | B2 * | 9/2018 | Nuber | ...................... B60L 58/14 |
| 11,345,327 | B2 * | 5/2022 | Passman | ............... B60W 10/08 |
| 2013/0268150 | A1 * | 10/2013 | Weslati | ................. B60W 10/26 701/1 |
| 2014/0350764 | A1 * | 11/2014 | Arai | ........................ B60L 50/16 180/65.265 |
| 2016/0137184 | A1 | 5/2016 | Hokoi et al. | |

(Continued)

FOREIGN PATENT DOCUMENTS

| | | |
|---|---|---|
| JP | 2014-151760 A | 8/2014 |
| JP | 2015-209114 A | 11/2015 |

(Continued)

*Primary Examiner* — George C Jin
(74) *Attorney, Agent, or Firm* — Sughrue Mion, PLLC

(57) ABSTRACT

An HV-ECU executes processing of steps. The steps include: a step of turning on a result display permission flag when an assist condition visible to a user is established; a step of calculating energy consumption in each travel section and total energy consumption when all the assist conditions are established and look-ahead information is updated; a step of generating a travel plan when the total energy consumption is greater than remaining energy; a step of executing switching control in accordance with the travel plan; and a step of outputting a result display when the result display permission flag is in an ON state when a vehicle reaches a destination.

8 Claims, 6 Drawing Sheets

(56) References Cited

U.S. PATENT DOCUMENTS

| | | | | |
|---|---|---|---|---|
| 2016/0368483 A1* | 12/2016 | Nawata | ................ | B60W 20/13 |
| 2018/0170360 A1* | 6/2018 | Kim | .................... | B60W 10/08 |
| 2020/0130670 A1* | 4/2020 | Ogawa | .............. | G01C 21/3605 |
| 2022/0126812 A1* | 4/2022 | Ogawa | ............... | B60W 50/082 |

FOREIGN PATENT DOCUMENTS

| | | |
|---|---|---|
| JP | 2016-097697 A | 5/2016 |
| WO | 2015/162475 A2 | 10/2015 |

\* cited by examiner

HYBRID VEHICLE

CROSS-REFERENCE TO RELATED APPLICATION

This application claims priority to Japanese Patent Application No. 2020-179461 filed on Oct. 27, 2020, incorporated herein by reference in its entirety.

BACKGROUND

1. Technical Field

The present disclosure relates to control of a hybrid vehicle.

2. Description of Related Art

In a hybrid vehicle mounted with a motor generator as a drive source and an engine as an electric power source, one of a plurality of control modes is selected to control the vehicle according to the selected control mode. The control modes include, for example, a charge depleting (CD) mode and a charge sustaining (CS) mode. The CD mode allows continuous electric traveling as much as possible while the engine is turned off by consuming electric power stored in an onboard battery. The CS mode allows easier startup of the engine than the CD mode, and allows the vehicle to travel while maintaining the state of charge of the onboard battery in a constant range by using the engine and the motor generator.

When such a hybrid vehicle travels to a destination set by a user, switching control is performed for switching the control modes as appropriate depending on the situation of a travel route.

For example, Japanese Unexampled Patent Application Publication No. 2014-151760 discloses a technique for setting a travel route to a destination, and selecting one of an EV mode and an HV mode for each of a plurality of sections of the set travel route except for one or more sections before the destination, the EV mode being a mode for electric traveling, the HV mode being a mode using the engine and the motor generator.

SUMMARY

The hybrid vehicle having the aforementioned configuration may notify the user of the effect of the switching control by indicating how the travel distance, by electric traveling using electric power of the onboard battery when the switching control is executed in accordance with the travel situations, varies as compared with the travel distance when the switching control is not executed. Therefore, it is required to accurately calculate the travel distance by electric driving using the electric power from the onboard battery in both the case where the switching control is executed and the case where the switching control is not executed.

However, in the case where, while traveling to the destination, the vehicle performs electric traveling during a period of time until the switching control is restated after the IG switch is turned off and then turned on, the travel distance during the period of time, which is to be calculated as the travel distance when the switching control is executed unless the IG switch is turned off, may not be counted as the travel distance when the switching control is executed. Hence, it may be difficult to accurately calculate the travel distance by electric driving using the electric power of the onboard battery in the case where the switching control is executed according to the traveling situations and in the case where the switching control is not executed.

The present disclosure has been made to solve the above problem, and it is an object of the present disclosure to provide a hybrid vehicle that accurately calculates the travel distance by electric driving using electric power from an onboard battery in the case where switching control is performed according to the driving situations and in the case where the switching control is not performed.

A hybrid vehicle according to an aspect of the present disclosure incudes an electric motor, a power storage device, an engine, and a controller. The electric motor is configured to generate drive force for the vehicle. The power storage device is configured to supply electric power to the electric motor. The engine is configured to generate electric power generated to charge the power storage device. The controller is configured to control the engine and the electric motor in accordance with one of a plurality of control modes. The modes include a charge depleting (CD) mode and a charge sustaining (CS) mode. The controller is configured to execute switching control for switching the control modes in accordance with a travel plan by using external information obtained from the outside of the vehicle after a predetermined condition is established, the travel plan including a travel route of the vehicle to a destination, the travel route including a plurality of sections assigned with one of the CD mode and the CS mode. The controller is configured to calculate, when there is an execution history of the switching control before the predetermined condition is established, a first travel distance and a second travel distance by using the execution history, the first travel distance being a distance by electric traveling using electric power from the power storage device with the engine being in a stopped state when the switching control is not executed, the second travel distance being a distance by the electric traveling with the engine being in the stopped state when the switching control is executed. The controller is configured to calculate the second travel distance by adding a travel distance by the electric traveling with the engine being in the stopped state during a period until the switching control is started after the predetermined condition is satisfied.

With the configuration, the first travel distance and the second travel distance are calculated by using the execution history, and the second travel distance is calculated by adding the travel distance by the electric traveling with the engine being in the stopped state during the period until the switching control is started after the predetermined condition is satisfied. Therefore, it is possible to accurately calculate the first travel distance and the second travel distance.

In the aspect, the predetermined condition includes a condition that a control system of the vehicle starts up.

With the configuration, when an execution history of the switching control is present after the control system of the vehicle starts up, the first travel distance and the second travel distance are calculated by using the execution history, and the second travel distance is calculated by adding the travel distance by the electric traveling with the engine being in the stopped state during the period until the switching control is started after the control system is started up. Therefore, it is possible to accurately calculate the first travel distance and the second travel distance.

Furthermore in the aspect, the predetermined condition includes a condition that the switching control is returned from a temporarily interrupted state.

Accordingly, after the switching control is returned from the temporarily interrupted state, the first travel distance and the second travel distance are calculated by using the execution history of the switching control, and the second travel distance is calculated by adding the travel distance by the electric traveling with the engine being in the stopped state during the period until the switching control is started after the switching control is returned. Therefore, it is possible to accurately calculate the first travel distance and the second travel distance.

Furthermore in the aspect, the controller is further configured to put the switching control in the temporarily interrupted state, when the switching control is in operation in at least any one of cases including a case where abnormal temperature occurs in the power storage device, a case where electric power in the power storage device is depleted, a case where the vehicle is out of the travel route, and a case where the engine is started up in the CD mode.

With the configuration, it is possible to accurately calculate the first travel route and the second travel route, even when the switching control is returned from the temporarily interrupted state in at least any of the cases including the case where abnormal temperature occurs in the power storage device, the case where electric power in the power storage device is depleted, the case where the vehicle is out of the travel route, and the case where the engine is started up in the CD mode.

Furthermore in the aspect, the execution history includes information about the first travel distance and the second travel distance during a period before the predetermined condition is established.

With the configuration, it is possible to accurately calculate the first travel distance and the second travel distance to the destination using the execution history.

Furthermore in the aspect, the vehicle further includes at least one of a communication device configured to be communicable with an external mobile terminal and a notification device configured to notify predetermined information. The controller notifies information about an effect of executing the switching control using at least one of the notification device and the mobile terminal via the communication device.

This configuration enables the user to recognize the information about the effect of executing the switching control.

Furthermore in the aspect, the vehicle further includes a communication device configured to be communicable with a mobile terminal via an external server. The controller transmits information about the effect of executing the switching control to the mobile terminal.

This configuration enables the user to recognize the information about the effect of executing the switching control.

Furthermore in the aspect, unless there is the execution history, the controller is configured not to execute processing to calculate the second travel distance by adding the travel distance by electric driving with the engine in the stopped state during the period until switching control is started after the predetermined condition is established.

With the configuration, it is possible to appropriately calculate the second travel distance depending on the presence or absence of the execution history.

According to the present disclosure, it is possible to provide the hybrid vehicle that accurately calculates the travel distance by electric driving using electric power from an onboard battery in the case where switching control is executed according to the traveling situations and in the case where the switching control is not executed.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Embodiments of the present disclosure will be described hereinafter in detail with reference to the drawings. Note that identical or corresponding component members are designated by identical reference signs to avoid repetition of the description thereof.

Figure 1:
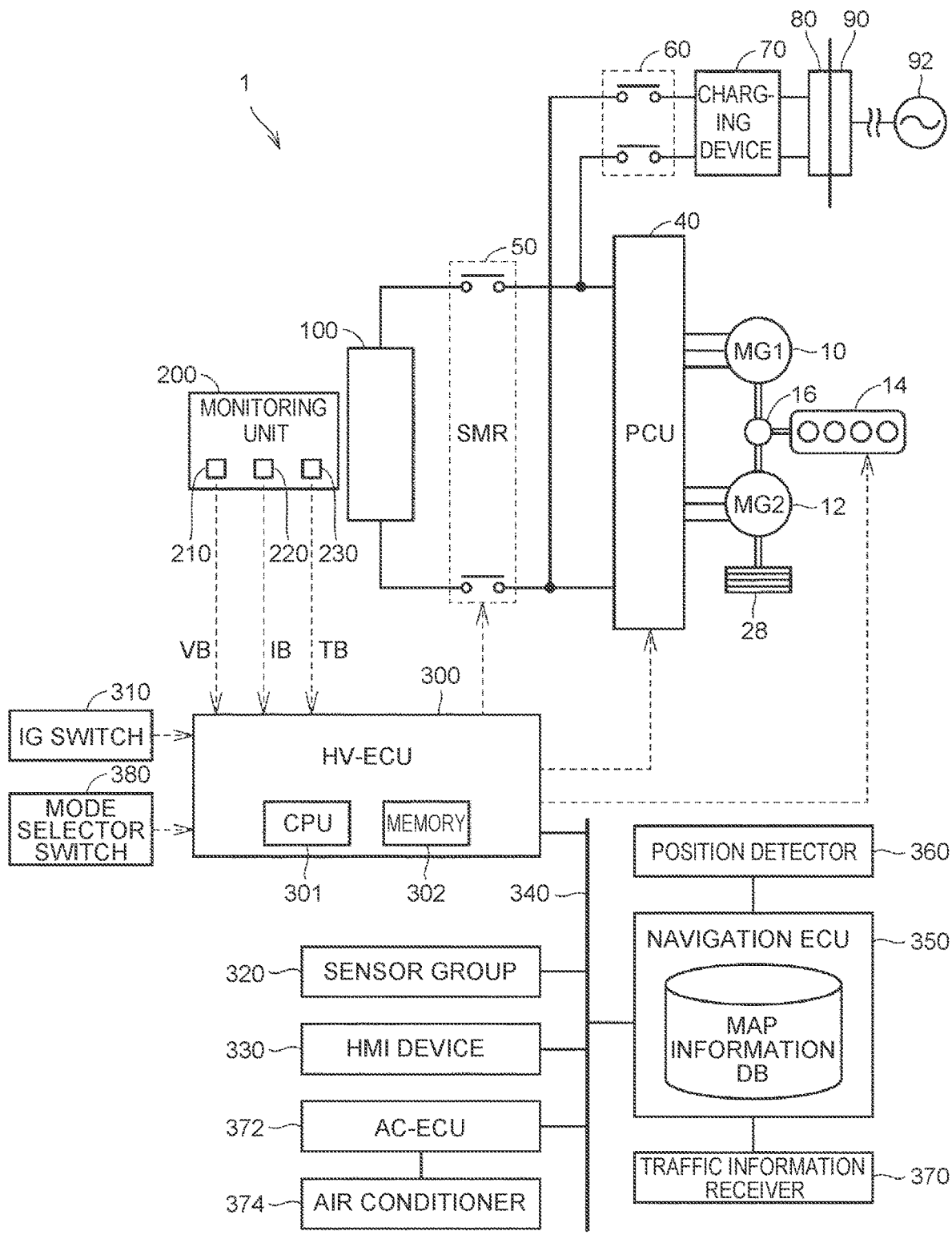
FIG. 1 shows an example of the configuration of a hybrid vehicle.

Hereinafter, description is given of an example of the configuration of a hybrid vehicle according to an embodiment of the present disclosure. FIG. 1 shows an example of the configuration of a hybrid vehicle 1 (hereinafter referred to as the vehicle 1). The vehicle 1 will be described, for example, as a series-parallel hybrid vehicle.

As shown in FIG. 1, the vehicle 1 includes a first motor generator (hereafter referred to as a first MG) 10, a second motor generator (hereafter referred to as a second MG) 12, an engine 14, a power split device 16, a drive wheel 28, a power control unit (PCU) 40, a system main relay (SMR) 50, a charging relay 60, a charging device 70, an inlet 80, a power storage device 100, a monitoring unit 200, a hybrid vehicle electronic control unit (HV-ECU) 300, an IG switch 310, a sensor group 320, a human machine interface (HMI) device 330, a navigation ECU 350, a position detector 360, a traffic information receiver 370, an air conditioner ECU (hereafter referred to as AC-ECU) 372, an air conditioner 374, and a mode selector switch 380.

The first MG 10 and the second MG 12 are three-phase alternate current rotary electric machines which are, for example, permanent-magnet type synchronous electric motors including a rotor having a permanent magnet embedded therein. The first MG 10 and the second MG 12 both have functions as an electric motor (motor) and as an electric generator (generator). The first MG 10 and the second MG 12 are connected to the power storage device 100 via the PCU 40.

The first MG 10 is driven by an inverter included in the PCU 40 to rotate an output shaft of the engine 14 when, for example, the engine 14 is started up. In generating electric power, the first MG 10 generates electric power by receiving motive power from the engine 14. The electric power generated by the first MG 10 is stored in the power storage device 100 via the PCU 40.

The second MG 12 is driven by the inverter included in the PCU 40 when, for example, the vehicle 1 travels. The motive power of the second MG 12 is transmitted to the drive wheel 28 via a motive power transmission gear (not illustrated) such as a differential gear or a reduction gear. The second MG 12 is also driven by the drive wheel 28 when, for example, the vehicle 1 is braking, and thereby the second MG 12 operates as an electric power generator to perform regenerative braking. The electric power generated in the second MG 12 is stored in the power storage device 100 via the PCU 40.

The engine 14 is a publicly known internal combustion engine that burns fuel (gasoline or gas oil), such as a gasoline engine and a diesel engine, to output motive power. The engine 14 is configured such that the operating states, such as a throttle opening angle (intake air amount), a fuel supply amount, and ignition timing, can electrically be controlled by the HV-ECU 300. The HV-ECU 300 controls a fuel injection amount, the ignition timing, the intake air amount, or the like, of the engine 14 such that the engine 14 operates at a target speed and a target torque set based on the states of the vehicle 1.

The power split device 16 splits the motive power of the engine 14 to a path transmitting the motive power to the drive wheel 28 and to a path transmitting the motive power to the first MG 10. The power split device 16 is constituted of a planetary gear mechanism including, for example, a sun gear, a ring gear, a pinion gear, and a carrier.

The PCU 40 is an electric power converter that converts electric power between the power storage device 100 and the first MG 10, and between the power storage device 100 and the second MG 12 based on a control signal from the HV-ECU 300. The PCU 40 is configured to include an inverter (not illustrated) that converts direct-current electric power from the power storage device 100 to alternating-current electric power to drive the first MG 10 or the second MG 12, and a converter (not illustrated) that regulates the voltage level of the direct-current electric power supplied to the inverter from the power storage device 100.

The SMR 50 is electrically connected between the power storage device 100 and the PCU 40. Closing and opening of the SMR 50 are controlled in accordance with a control signal from the HV-ECU 300. For example, the SMR 50 is controlled to be closed when startup operation of the control system is performed and the IG switch 310 is put in an ON state.

The power storage device 100 is a direct-current power source configured to be rechargeable, and is a secondary battery such as a nickel-hydrogen battery or a lithium-ion battery including a solid or liquid electrolyte. As the power storage device 100, capacitors such as electric double-layered capacitors can also be adopted. The power storage device 100 supplies electric power for generating travel driving force of the vehicle 1 to the PCU 40. In addition, the power storage device 100 is charged by the electric power generated by electric power generating operation using the first MG 10 and the engine 14, charged by the electric power generated by the regenerative braking of the second MG 12, and discharged by the driving operation of the first MG 10 or the second MG 12.

The monitoring unit 200 monitors the status of the power storage device 100. The monitoring unit 200 includes, for example, a voltage detector 210, a current detector 220, and a temperature detector 230. The voltage detector 210 detects a voltage VB across the terminals of the power storage device 100. The current detector 220 detects a current IB input into and output from the power storage device 100. The temperature detector 230 detects a temperature TB of the power storage device 100. The respective detectors output the results of detection to the HV-ECU 300.

The charging relay 60 is electrically connected between the SMR 50 and the charging device 70. Closing and opening of the charging relay 60 are controlled in accordance with a control signal from the HV-ECU 300.

The charging device 70 is electrically connected between the charging relay 60 and the inlet 80. The charging device 70 is, for example, an AC-DC converter (inverter). The charging device 70 converts the alternating-current electric power supplied from the external power source 92 via a connector 90 described later and the inlet 80 into direct-current electric power, and output the direct-current electric power to the charging relay 60. The charging device 70 is controlled in accordance with a control signal from the HV-ECU 300.

The charging device 70 is not specifically limited to performing AC-DC conversion operation. When the direct-current electric power is supplied from the inlet 80 to the charging device 70, the charging device 70 may be configured to operate as a DC-DC converter.

The inlet 80 is configured to allow insertion of the connector 90 through mechanical coupling such as fitting. As the connector 90 is inserted into the inlet 80, electrical connection between the vehicle 1 and the external power source 92 is established. In this case, when the SMR 50 and the charging relay 60 are closed, the external power source 92 can supply electric power to the power storage device 100 via the charging device 70 and the charging relay 60. In the following description, charging the power storage device 100 using the electric power from the external power source 92 is referred to as plug-in charging.

The HV-ECU 300 includes a central processing unit (CPU) 301 and a memory (including a non-volatile memory that can maintain the memory state even after the IG is turned off, such as a read only memory (ROM), and a random access memory (RAM)) 302. The HV-ECU 300 controls the devices in the vehicle 1 (such as the engine 14, the PCU 40, the SMR 50, the charging relay 60, the charging device 70, and the HMI device 330) to put the vehicle 1 in a desired state, based on the signals received from the monitoring unit 200, the IG switch 310, the sensor group 320 and the mode selector switch 380 and on information such as maps and programs stored in the memory 302. Various controls executed by the HV-ECU 300 can be processed by dedicated hardware (electronic circuits) as well as by software.

The HV-ECU 300 calculates, for example, a state of charge (SOC) indicating the remaining capacity of the power storage device 100, using the result of detection by the monitoring unit 200 while the vehicle 1 is operated. The SOC expresses as a percentage a ratio of the current storage amount to the fully charged storage amount of the power storage device 100. For example, as the calculation method of the SOC, various publicly known methods, such as a method of current value accumulation (Coulomb count), or a method of estimating open circuit voltage (OCV), can be adopted.

The IG switch 310 is a switch that is turned on when the startup operation of the control system of the vehicle 1 is performed and turned off when stop operation of the control system of the vehicle 1 is performed.

The HV-ECU 300 is connected to the sensor group 320, the HMI device 330 and the navigation ECU 350 via a communication bus 340. The navigation ECU 350 is connected to the position detector 360 and the traffic information receiver 370.

The sensor group 320 includes, for example, an accelerator pedal sensor, a vehicle speed sensor, and a brake pedal sensor. The accelerator pedal sensor detects the amount of accelerator pedal operation by the user. The vehicle speed sensor detects the vehicle speed of the vehicle 1. The brake pedal sensor detects the amount of brake pedal operation by the user. The respective sensors output the detection results to the HV-ECU 300.

The HMI device 330 provides the user with information to assist the operation of the vehicle 1. For example, the HMI device 330 is a touch panel display provided in the cabin of the vehicle 1, the touch panel including a speaker. The HMI device 330 provides (notifies) a variety of information to the user by outputting visual information (graphic information, text information), audio information (voice information, sound information), or the like.

The HMI device 330 functions as a display that receives the current position of the vehicle 1 and map information and traffic congestion information around the current position, etc. from the navigation ECU 350 via the communication bus 340, and displays the current position of the vehicle 1 along with the map information and traffic congestion information therearound.

The HMI device 330 also functions as a user-accessible touch panel that allows the user to change the scale of the displayed map or to input a destination of the vehicle 1 by touching the touch panel. When the destination is input on the HMI device 330, the destination information is transmitted to the navigation ECU 350 via the communication bus 340.

The devices connected to the communication bus 340 may be configured to be communicable with each other via the communication bus 340 by controller area network (CAN) communication, or may be configured to be communicable with each other via wireless communication in place of or in addition to the communication bus 340.

The navigation ECU 350 includes a CPU which is not illustrated and a memory. In the memory, a map information database (DB) is constructed. The navigation ECU 350 outputs the current position of the vehicle 1, the map information and traffic congestion information therearound, etc. to the HMI device 330 and the HV-ECU 300, based on various information stored in the map information DB, various information detected by the position detector 360, and various information received from the traffic information receiver 370.

In addition, the navigation ECU 350 outputs map information and road traffic information on a travel route from the current position of the vehicle 1 to the destination (hereinafter referred to as "look-ahead information") to the HV-ECU 300 at a given time (for example, every few tens of seconds).

The map information DB stores map information. The map information includes data about "nodes" that indicate intersections, stops, etc., "links" that are made up of connections of nodes, and "facilities" (buildings, parking lots, etc.) that are located along the links. The map information also includes position information on each node, distance information on each link, road type information included in each link (information such as urban areas, highways, general roads, etc.), and gradient information on each link. The map information is not limited to information acquired by reading from the map information DB. The map information may be acquired sequentially through communication with an external database in addition to or in place of the information acquired from the map information DB.

The position detector 360 acquires the current position of the vehicle 1 based on, for example, signals (radio wave) from global positioning system (GPS) satellites, and outputs a signal indicating the current position of the vehicle 1 to the navigation ECU 350. The method for acquiring the current position of the vehicle 1 may be a method for acquiring the current position using satellites capable of detecting the position, other than GPS satellites, or a method for acquiring the current position by exchanging prescribed information with mobile base stations or wireless local area network (LAN) access points.

The traffic information receiver 370 receives prescribed traffic information. The prescribed traffic information includes, for example, road traffic information provided by FM multiplex broadcasts, and road traffic information collected from probe vehicles or probe centers. The road traffic information includes at least traffic congestion information, and may also include other road control information and parking information. The traffic information is updated, for example, every few minutes.

The AC-ECU 372 controls operation of the air conditioner 374 described later. The AC-ECU 372 includes a CPU and a memory which are not illustrated. The AC-ECU 372 is configured to be able to acquire information on operation status of the air conditioner 374 (for example, information on energy consumption, etc.) and transmit the acquired information to the HV-ECU 300. In addition, the AC-ECU 372 is configured to be able to generate, for example, a control command value for the air conditioner 374 with a set temperature in the cabin of vehicle 1 as a target value, and to transmit the generated control command value as a control signal to the air conditioner 374.

The air conditioner 374 is configured to allow temperature-controlled air to be emitted from air vents provided in the vehicle 1 by using an electrical device, such as a compressor, that can regulate the temperature in the cabin of the vehicle 1.

The mode selector switch 380 is configured to allow selection of one of a plurality of control modes. The control modes will be described later. Upon reception of the user's operation, the mode selector switch 380 transmits to the HV-ECU 300 a signal indicating that the operation has been performed.

In the present embodiment, the vehicle 1 is controlled by the HV-ECU 300 in accordance with any one of the control modes. The control modes include a charge depleting (CD) mode and a charge sustaining (CS) mode. The CD mode is a control mode that uses discharged electric power from the power storage device 100 to continue electric driving of the vehicle 1 as much as possible while the engine 14 is stopped by consuming the electric power stored in the power storage device 100. The CS mode is a control mode that allows the engine 14 to be started more easily than the CD mode, and allows travel of the vehicle 1 while maintaining the remaining quantity (SOC) of the power storage device 100 within a constant range by charging and discharging the power storage device 100 using the engine 14, the first MG 10 and the second MG 12.

When, for example, one of the CD mode and the CS mode is set as the control mode, the HV-ECU 300 controls the engine 14, the first MG 10 and the second MG 12, depending on the set control mode.

When, for example, the travel route is not set (i.e. no destination is set), the HV-ECU 300 controls the engine 14, the first MG 10 and the second MG 12 in accordance with the CD mode until the SOC of the power storage device 100 is below a prescribed value. In other words, the HV-ECU 300 performs electric traveling using the second MG 12 while the engine 14 is in a stopped state. Even during selection of the CD mode, when the driving force required for the vehicle 1 increases due to, for example, an increased depression amount of the accelerator pedal, the HV-ECU 300 starts the engine 14 by using the first MG 10 and, causes the vehicle 1 to travel using the engine 14 and the second MG 12.

When the SOC of the power storage device 100 falls below the prescribed value, the HV-ECU 300 switches from the CD mode to the CS mode, and controls the engine 14, the first MG 10 and the second MG 12 in accordance with the CS mode. In other words, the HV-ECU 300 uses the second MG 12 to cause the vehicle 1 to travel while causing the first MG 10 to generate power using the motive power of the engine 14 so as to keep the SOC of the power storage device 100 within a prescribed range based on the SOC of the power storage device 100 when the control mode is switched. Even during selection of the CS mode, the HV-ECU 300 may stop the engine 14 and uses the second MG 12 to perform electric traveling when, for example, the SOC of the power storage device 100 exceeds the prescribed range.

The HV-ECU 300 also sets the CS mode as the control mode when, for example, the mode selector switch 380 is operated to request the CS mode. In addition, when, for example, the mode selector switch 380 is operated to request the CD mode, the HV-ECU 300 also sets the CS mode as the control mode, on condition that the SOC of the power storage device 100 is the prescribed value or more. Even in the case where the CD mode is selected by operation made on the mode selector switch 380, the HV-ECU 300 also switches from the CD mode to the CS mode when the SOC of the power storage device 100 is below the prescribed value. In the description below, the prescribed value of the SOC for switching from the CD mode to CS mode may be stated as a switching threshold.

In the present embodiment, the control modes include CD mode, the CS mode, and other control modes. Other control modes include, for example, a mode that prohibits operation of the engine 14. Operating the mode selector switch 380 allows selection of one of a plurality of control modes.

In addition, when a travel route is set (when a destination is set), the HV-ECU 300 executes travel assist control to switch between the CD mode and the CS mode depending on the travel plan. In the following description, the travel assist control may be referred to as switching control.

Specifically, when a destination is set, the HV-ECU 300 sets a travel route from the current position of the vehicle 1 to the destination. For example, the HV-ECU 300 sets the travel route corresponding to conditions, such as a travel distance, presence or absence of highway use, and presence or absence of traffic congestion. When the travel route is set, the HV-ECU 300 sets a travel plan by dividing the travel route from the current position of the vehicle 1 to the destination into a plurality of travel sections, and assigning one of the CD mode and the CS mode to each of the travel sections. In the present embodiment, the HV-ECU 300 divides the travel route into a plurality of travel sections by using, for example, the nodes on the travel route as separators between the travel sections and using the links as the travel sections.

The HV-ECU 300 acquires the updated look-ahead information in the navigation ECU 350, and calculates energy consumption En for each of the travel sections that constitute the travel route based on the acquired look-ahead information. The HV-ECU 300 calculates the energy consumption En for each of the travel sections using information included in the look-ahead information, such as slope information, road type information, information about vehicle speed including speed limits, information on the presence or absence of traffic congestion, or the travel distance or the like. The HV-ECU 300 may calculate the energy consumption En by using a vehicle weight, or the like, based on the number of occupants of the vehicle 1, in addition to the look-ahead information. The energy consumption En indicates, for example, the energy required for the vehicle 1 to travel a target section at a vehicle speed equivalent to the speed limit or a vehicle speed equivalent to the speed in heavy traffic.

For example, the HV-ECU 300 assigns one of the CD mode and the CS mode to each of the travel sections such that the SOC of the power storage device 100 falls within the prescribed range at the point when the vehicle 1 reaches the destination. For example, the prescribed range is the range of SOC based on which complete depletion of the electric power of the power storage device 100 can be determined. For example, an upper limit of the prescribed range may be a SOC threshold for switching from the CD mode to the CS mode. Alternatively, the upper limit of the prescribed range may be a predetermined value higher than the threshold, or may be a predetermined value lower than the threshold. A lower limit of the prescribed range is a predetermined value set to be low enough to prevent promotion of deterioration of the power storage device 100.

For example, the HV-ECU 300 assigns the CD mode to each of the travel sections when a sum of the energy consumption En for each of the travel sections (hereafter referred to as the total energy consumption) Esum is less than the energy equivalent to the amount of electric power required for the current SOC of the power storage device 100 to fall within the prescribed range (hereinafter referred to as remaining energy Er). The threshold indicates an expected value within the prescribed range of SOC when the vehicle 1 reaches the destination.

When the total energy consumption Esum is greater than the remaining energy Er, the HV-ECU 300 preferentially assigns the CD mode to at least one of the travel sections, and assigns the CS mode to those not assigned with the CD mode.

For example, the HV-ECU 300 identifies the travel sections preferentially assigned with the CD mode, among the travel sections, as the CD mode priority section, and assigns the CD mode to the identified travel sections. The CD mode priority sections includes, for example, travel sections such as those in urban areas, residential areas, or narrow streets, where travel noise is required to be suppressed to relatively low levels. Information about whether the travel sections are urban areas, residential areas, or narrow streets is pre-stored in the map information DB.

After the CD mode is assigned to the CD mode priority section, the HV-ECU 300 allocates the CD mode to other travel sections in order of lower energy consumption En, and integrates the energy consumption in the allocated travel sections. The HV-ECU 300 allocates the CD mode to the travel sections until a value, obtained by adding the sum of the total energy consumed in the travel sections corresponding to the CD mode priority section to the accumulated energy consumption (sum of the energy consumed in the CD mode), becomes greater than the remaining energy Er. The HV-ECU 300 stops allocating the CD mode at the point when the sum of the energy consumed in the CD mode becomes greater than the remaining energy Er, and assigns the CS mode to the travel sections not allocated with the CD mode.

In this way, the control modes can be assigned to each of the travel sections to ensure that the SOC of the power storage device 100 falls within the prescribed range at the point when the vehicle 1 reaches the destination. After the travel plan is set, the HV-ECU 300 executes switching control to switch the control modes in accordance with the set travel plan. Therefore, when the operation of the vehicle 1 is started, and the vehicle 1 passes a node on the travel route, the HV-ECU 300 switches to the control mode that is set for the travel section subsequent to the node.

The vehicle 1 having the aforementioned configuration may notify the user of how the travel distance, by electric traveling using the electric power of the power storage device 100 that is an onboard battery in the case where the switching control is executed for switching the control modes as appropriate in accordance with the travel plan, varies as compared with the travel distance in the case where the switching control is not executed in accordance with the travel plan.

Figure 2:
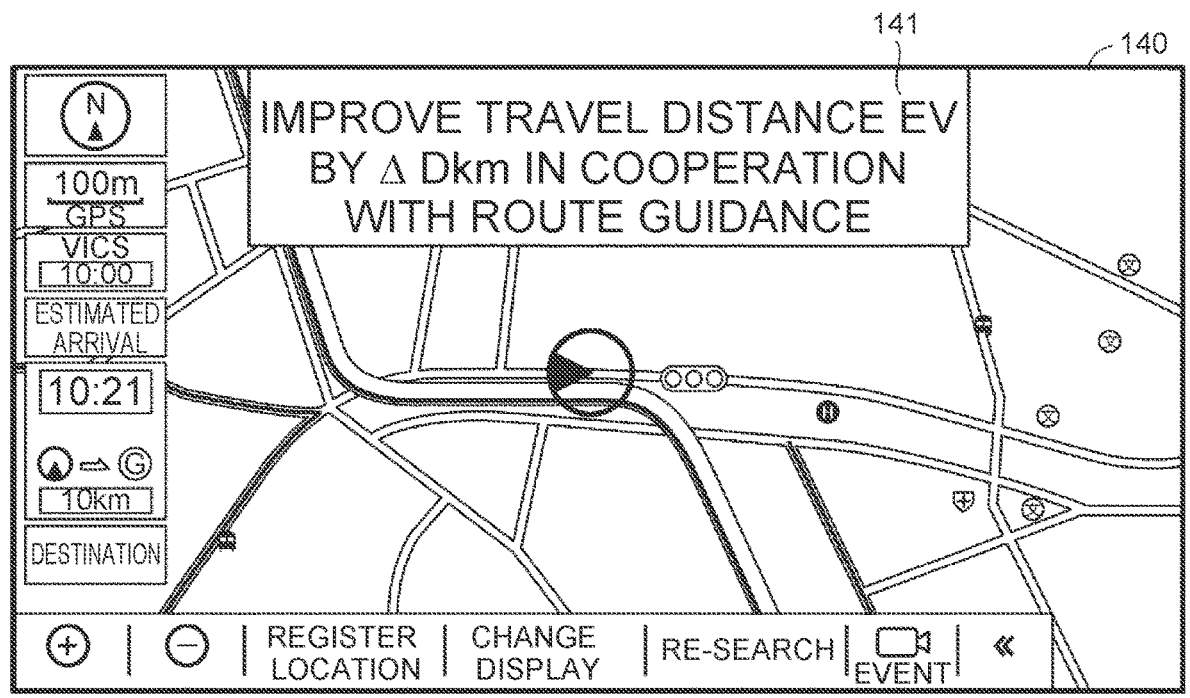
FIG. 2 shows a display example in the case of notifying a user of the effect of executing control for switching control modes as appropriate in accordance with a travel plan.

FIG. 2 shows a display example in the case of notifying the user of the effect of executing the control for switching the control modes as appropriate in accordance with the travel plan.

The navigation ECU 350 displays information on the display of the HMI device 330 in response to a request from the HV-ECU 300, the information indicating how much the travel distance by electric traveling using the electric power from the power storage device 100 is improved, as the effect of executing the control for switching the control modes as appropriate in accordance with the travel plan when, for example, the vehicle 1 is traveling, or when the vehicle 1 reaches the destination. FIG. 2 shows an example of displaying on a navigation screen text information indicating that the travel distance, by electric driving using the electric power of the power storage device 100, is improved by Δ Dkm due to, for example, the control mode in cooperation with route guidance (i.e. execution of control for switching the control modes as appropriate in accordance with the travel plan). Such text information is displayed on the HMI device 330, which allows the user to recognize the effect of executing the switching control for switching the control modes as appropriate in accordance with the travel plan. Therefore, at the time of notifying such information to the user, it is required to accurately calculate the travel distance in both the case where the switching control is executed and the case where the switching control is not executed.

However, in the case where, while traveling to the destination, the vehicle 1 performs electric traveling during a period of time that is before the switching control is restated after the IG switch is turned off and then turned on, the travel distance during the period of time, which is to be calculated as the travel distance in the case where the switching control is executed unless the IG switch is turned off, may not be counted as the travel distance in the case where the switching control is executed.

Figure 3:
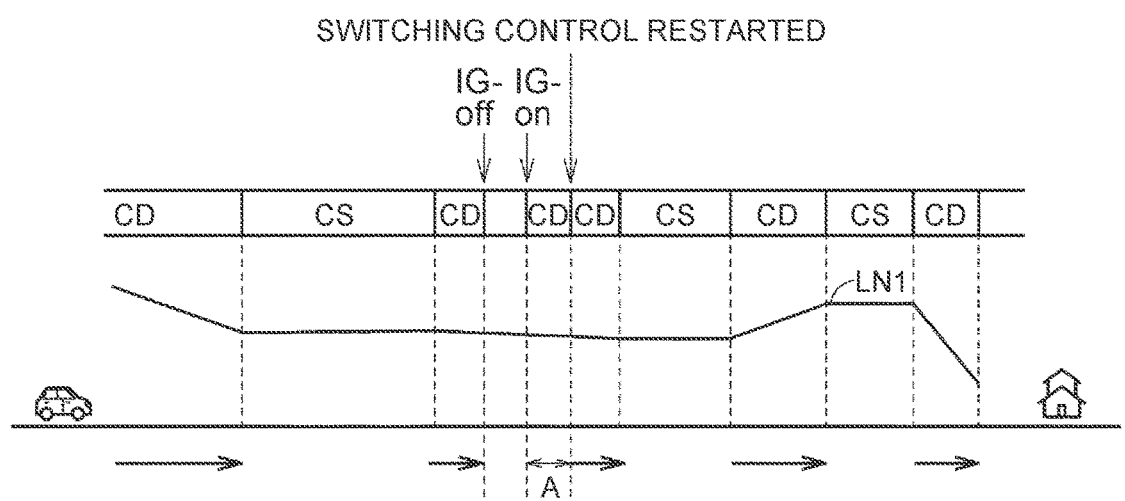
FIG. 3 is an explanatory view about a travel distance by electric traveling using electric power from a power storage device when an IG-off period is present.

FIG. 3 is an explanatory view about the travel distance by electric traveling using electric power from the power storage device 100 when an IG-off period is present. In FIG. 3, LN1 represents a change of SOC of the power storage device 100 when the switching control is executed. As a result of executing the switching control in accordance with the travel situations, when the vehicle 1 passes a node representing a boundary between the travel sections, the control mode corresponding to the travel section subsequent to the node is selected. Therefore, every time the vehicle 1 passes the node, the CD mode is switched to the CS mode and the CD mode. After that, when the IG is turned off in the vehicle 1 due to refueling, user break, or the like, the switching control is left in a non-executed state after the IG is turned off. Then, when the IG is turned on to depart again, the switching control is restarted when the look-ahead information is acquired. However, since the look-ahead information is acquired every few minutes, there may be a gap between the time of turning on the IG and the time of restarting the switching control. Accordingly, when the CD mode is selected immediately after the IG is turned on, and thereby electric traveling is started using the electric power of the power storage device 100, a distance A of a section that the vehicle 1 has traveled before the switching control is restarted is not counted as the travel distance by electric traveling in the case where the switching control is executed. Hence, it may be difficult to accurately calculate the travel distance by electric driving using the electric power of the power storage device 100 in the case where the switching control is executed in accordance with the travel situations and the case where the switching control is not executed.

Accordingly, in the present embodiment, the HV-ECU 300 operates as follows. Specifically, the HV-ECU 300 executes the switching control using external information (look-ahead information) acquired from the outside of the vehicle 1 after a predetermined condition (e.g., a condition that the IG is turned on) is established. The HV-ECU 300 calculates the travel distance by electric traveling using the electric power of the power storage device 100 with the engine 14 being stopped in the case where the switching control is not executed (hereinafter referred to as "non-assisted EV travel distance") and the travel distance by electric traveling with the engine 14 being stopped in the case where the switching control is executed (hereinafter referred to as "assisted EV travel distance"). When there is an execution history of the switching control before the predetermined condition is met, the HV-ECU 300 uses the execution history to calculate the non-assisted EV travel distance and the assisted EV travel distance. Furthermore, the HV-ECU 300 calculates the assisted EV travel distance by adding the traveling distance by electric traveling with the engine 14 being in the stopped state during a period until the switching control is started after the predetermined condition is established.

In this way, the non-assisted EV travel distance and the assisted EV travel distance are calculated by using the execution history, and the assisted EV travel distance is calculated by adding the travel distance by the electric traveling with the engine 14 being in the stopped state during the period until the switching control is started after the predetermined condition is established. Therefore, it is possible to accurately calculate the non-assisted EV travel distance and the assisted EV travel distance.

Figure 4:
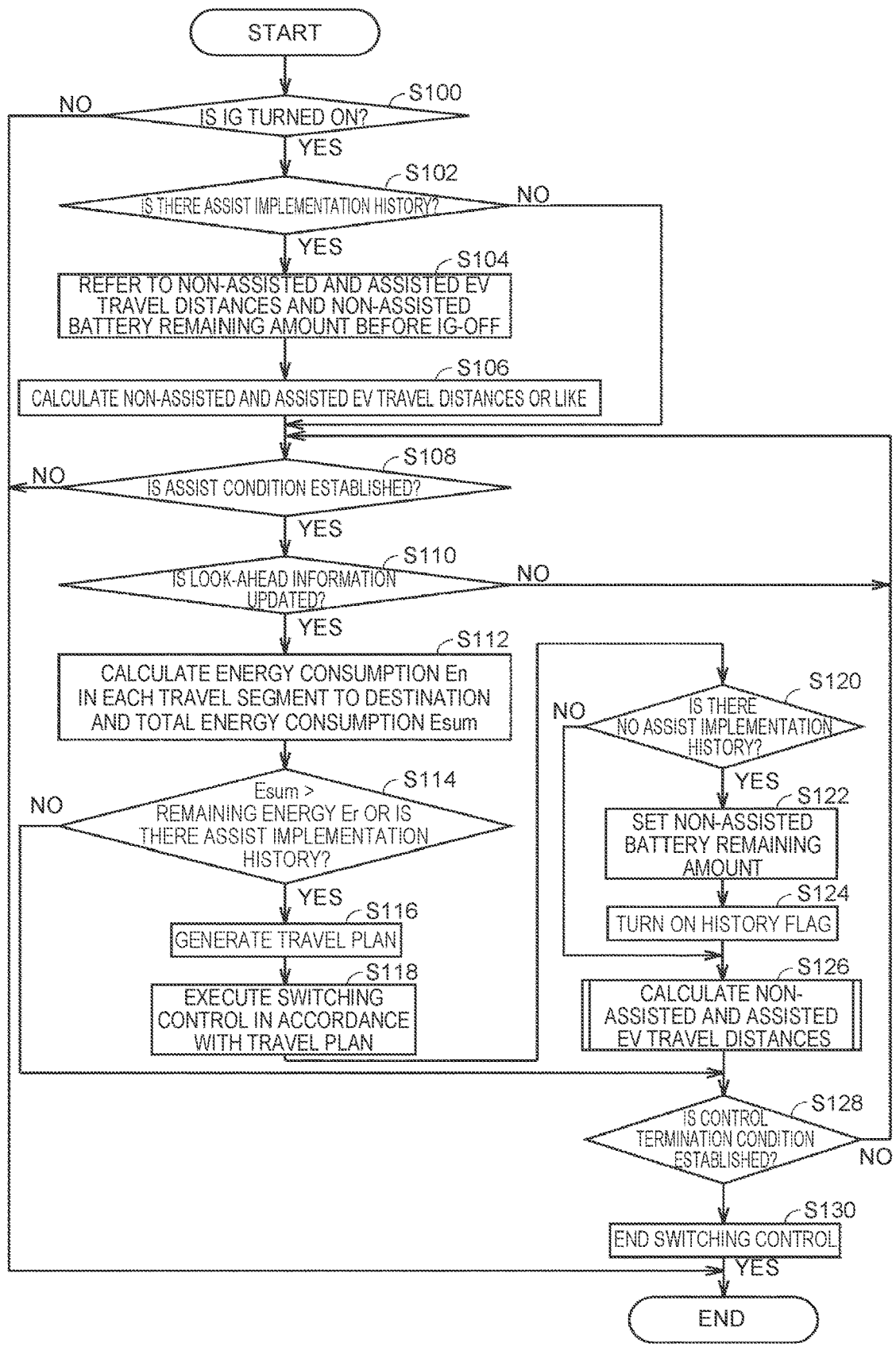
FIG. 4 is a flowchart showing an example of processing executed in an HV-ECU.

With reference to FIG. 4, an example of control processing executed in the HV-ECU 300 will be described below. FIG. 4 is a flowchart showing an example of processing executed in the HV-ECU 300. A series of processing shown in the flowchart is repeatedly executed at given timing by the HV-ECU 300.

In step (hereinafter stated as "S") 100, the HV-ECU 300 determines whether or not the IG is in an ON state. The HV-ECU 300 turns on an IG flag when, for example, the user performs startup operation of the control system of the vehicle 1 and thereby the IG switch 310 is turned on. The HV-ECU 300 determines that IG is in the ON state when the IG flag is turned on. Alternatively, the HV-ECU 300 may determine that the IG is in the ON state, when, for example, the SMR 50 is in a closed state. When it is determined that the IG is in the ON state (YES in S100), the processing is shifted to S102. When it is determined that the IG is not in the ON state (NO in S100), the processing is ended.

In S102, the HV-ECU 300 determines whether or not there is any history information (hereinafter referred to as assist implementation history) indicating that the switching control is implemented in accordance with the travel plan. The HV-ECU 300 determines that there is an assist implementation history, when, for example, a flag corresponding to the assist implementation history (hereinafter stated as the history flag) is in the ON state. When it is determined that there is an assist implementation history (YES in S102), the processing is shifted to S104. When it is determined that there is no assist implementation history (NO in S102), the processing is shifted to S108.

In S104, the HV-ECU 300 refers to the non-assisted EV travel distance and the assisted EV travel distance immediately before the IG is turned off (hereinafter referred to as before IG-off), and a non-assisted battery remaining amount before IG-off, which are stored in memory 302. In this case, the HV-ECU 300 sets the non-assisted EV travel distance before IG-off as an initial value of the non-assisted EV travel distance (previous value), sets the assisted EV travel distance before IG-off as an initial value of the assisted EV travel distance (previous value), and sets the value indicating the non-assisted battery remaining amount before IG-off as an initial value of the non-assisted battery remaining amount (previous value).

In S106, the HV-ECU 300 calculates the non-assisted EV travel distance and the assisted EV travel distance. When, for example, the non-assisted battery remaining amount is greater than zero, the HV-ECU 300 calculates as the non-assisted EV travel distance a value obtained by adding the travel distance by electric driving using the electric power of the power storage device 100 of the vehicle 1 from the last IG-on to the present time to the non-assisted EV travel distance before IG-off. When, for example, the non-assisted battery remaining amount is equal to or less than zero, the HV-ECU 300 calculates as the non-assisted EV travel distance a value obtained by adding the travel distance by electric driving using the electric power of the power storage device 100 of the vehicle 1 from the last IG-on to the time when the non-assisted battery remaining amount becomes equal to or less than zero to the non-assisted EV travel distance before IG-off. For example, the HV-ECU 300 calculates as the assisted EV travel distance a value obtained by adding the travel distance by electric driving using the electric power of the power storage device 100 of the vehicle 1 from the last IG-on to the present time to the assisted EV travel distance before IG-off. In addition, the HV-ECU 300 calculates the non-assisted battery remaining amount by subtracting from the non-assisted battery remaining amount before IG-off the amount consumed by traveling and the amount consumed by auxiliaries in the vehicle 1 from the last IG-on to the present time.

In S108, the HV-ECU 300 determines whether or not an assist condition is established. The assist condition includes, for example, a condition that a destination is set and a travel route to the destination is set. In addition to the above conditions, the assist condition may include at least one condition out of a condition that no system abnormality occurs in the vehicle 1, a condition that the vehicle 1 is traveling on the travel route, and a condition that the SOC of the power storage device 100 is higher than the threshold. When it is determined that the assist condition is established (YES in S108), the processing is shifted to S110. When it is determined that the assist condition is not established (NO in S108), the processing is ended.

In S110, the HV-ECU 300 determines whether or not look-ahead information received from the navigation ECU 350 is updated. The HV-ECU 300 determines that the look-ahead information is updated when, for example, various information relating to the look-ahead information, such as prescribed road traffic information, is received. When it is determined that the look-ahead information is updated (YES in S110), the processing is shifted to S112. When it is determined that the look-ahead information is not updated (NO in S110), the processing is returned to S108, and put in a standby state until the look-ahead information is determined to be updated.

In S112, the HV-ECU 300 calculates the energy consumption En for each of the travel sections based on information included in the look-ahead information, such as slope information, road type information, and road traffic information on each of the travel sections. Since the method of calculation is as described above, the detailed description thereof is not repeated. The HV-ECU 300 also calculates a sum (sum total) of the energy consumption En for each of the travel sections as the total energy consumption Esum.

In S114, the HV-ECU 300 determines whether or not the total energy consumption Esum is greater than the remaining energy Er of the power storage device 100, or whether or not there is any assist implementation history. Since the remaining energy Er and the assist implementation history are as described above, the detailed description thereof is not repeated. When the total energy consumption Esum is determined to be greater than the remaining energy Er, or when the assist implementation history is determined to be present (YES in S114), the processing is shifted to S116. When it is determined that the total energy consumption Esum is equal to or less than the remaining energy Er and no assist implementation history is present (NO in S114), the processing is shifted to S128.

In S116, the HV-ECU 300 generates a travel plan. More specifically, the HV-ECU 300 assigns the CD mode to the travel sections specified as the CD mode priority section. The CD mode priority section is set in advance according to, for example, the type of the road type information (information such as urban areas, highways, and general road) included in the look-ahead information. For example, the travel sections including urban areas and narrow streets are stored in advance as the CD mode priority sections in the HV-ECU 300 or the navigation ECU 350, or the travel sections corresponding to the CD mode priority section are received as the road traffic information.

Furthermore, the HV-ECU 300 assigns the CD mode to the travel sections other than the CD mode priority sections. The HV-ECU 300 sorts the travel sections not specified as the CD mode priority section in order of lower energy consumption En, and assigns the CD mode to the sorted travel sections in order of lower energy consumption En. The HV-ECU 300 allocates the CD mode until the sum total of the energy consumption in the travel sections assigned with the CD mode exceeds the remaining energy. The HV-ECU 300 stops allocation of the CD mode at the point when the sum total of the energy consumption in the travel sections assigned with the CD mode exceeds the remaining energy.

Furthermore, the HV-ECU 300 assigns the CS mode to CD mode non-allocation sections. The HV-ECU 300 assigns the CS mode to the travel sections not allocated with the CD mode. A travel plan is generated by assigning one of the CD mode and the CS mode to a plurality of travel sections. Switching the control modes in accordance with the travel plan makes it possible to keep the SOC of the power storage device 100 within a prescribed range when the vehicle 1 reaches the destination. This makes it possible to use up just enough storage amount of the electric power in the power storage device 100.

In S118, the HV-ECU 300 executes switching control of the control modes in accordance with the generated travel plan. At the time, the HV-ECU 300 may display on the HMI device 330 information indicating, for example, that the switching control is in operation in accordance with the driving plan. When the switching control is executed, the HV-ECU 300 shifts the processing to S120.

In S120, the HV-ECU 300 determines whether or not there is no assist implementation history. The HV-ECU 300 determines that there is no assist implementation history when, for example, the history flag is in an OFF state. When it is determined that there is no assist implementation history (YES in S120), the processing is shifted to S124.

In S122, the HV-ECU 300 sets the non-assisted battery remaining amount. The non-assisted battery remaining amount indicates the amount of electric power available in the power storage device 100 during selection of the CS mode when the mode switching control in accordance with the travel plan is not executed. For example, the HV-ECU 300 uses the SOC of the power storage device 100 to set the non-assisted battery remaining amount. Since the method of calculating the SOC of the power storage device 100 is as described above, the detailed description thereof is not repeated. For example, the HV-ECU 300 sets the amount of electric power that is equivalent to the value obtained by subtracting a prescribed value from the value indicating the current SOC of the power storage device 100 as the non-assisted battery remaining amount. The prescribed value may be, for example, a switching threshold of the SOC for switching from the CD mode to the CS mode, or may be a value obtained by adding or subtracting a predetermined value to or from the switching threshold. Once the non-assisted battery remaining amount is set, the HV-ECU 300 shifts the processing to S124.

In S124, the HV-ECU 300 sets the history flag to the ON state. Once the history flag is set to the ON state, the HV-ECU 300 shifts the processing to S126. When it is determined in S120 that the assist implementation history is present (NO in S122), the processing is shifted to S126.

In S126, the HV-ECU 300 calculates the non-assisted EV travel distance and the assisted EV travel distance. Specific methods for calculating the non-assisted EV travel distance and the assisted EV travel distance will be described later with FIG. 5.

In S128, the HV-ECU 300 determines whether or not a control termination condition is established. The control termination condition includes, for example, a condition that the vehicle 1 reaches the destination. The HV-ECU 300 determines that the vehicle 1 reaches the destination when, for example, the current position of the vehicle 1 received from the navigation ECU 350 is within a prescribed range including the destination. In addition, the control termination condition includes a condition that the IG is turned off. The control termination condition may further include, for example, a condition that abnormality occurs in the vehicle 1. When it is determined that the control termination condition is established (YES in S128), the processing is shifted to S130. When it is determined that the control termination condition is not established (NO in S128), the processing returns to S108.

In S130, the HV-ECU 300 ends the switching control in accordance with the travel plan. The HV-ECU 300 sets the history flag to the OFF state when the control termination condition is established due to, for example, establishment of the condition that the vehicle 1 reaches the destination. The non-assisted EV travel distance and the assisted EV travel distance are reset to initial values after the information on the effects of executing the switching control shown in FIG. 2 is displayed on the HMI device 330, for example.

When the vehicle 1 does not yet reach the destination and the control termination condition is established due to the IG being turned off, the HV-ECU 300 stores a value representing the last non-assisted EV travel distance in the memory 302 as the non-assisted EV travel distance before IG-off, and stores a value representing the last assisted EV travel distance in the memory 302 as the assisted EV travel distance before IG-off.

Figure 5:
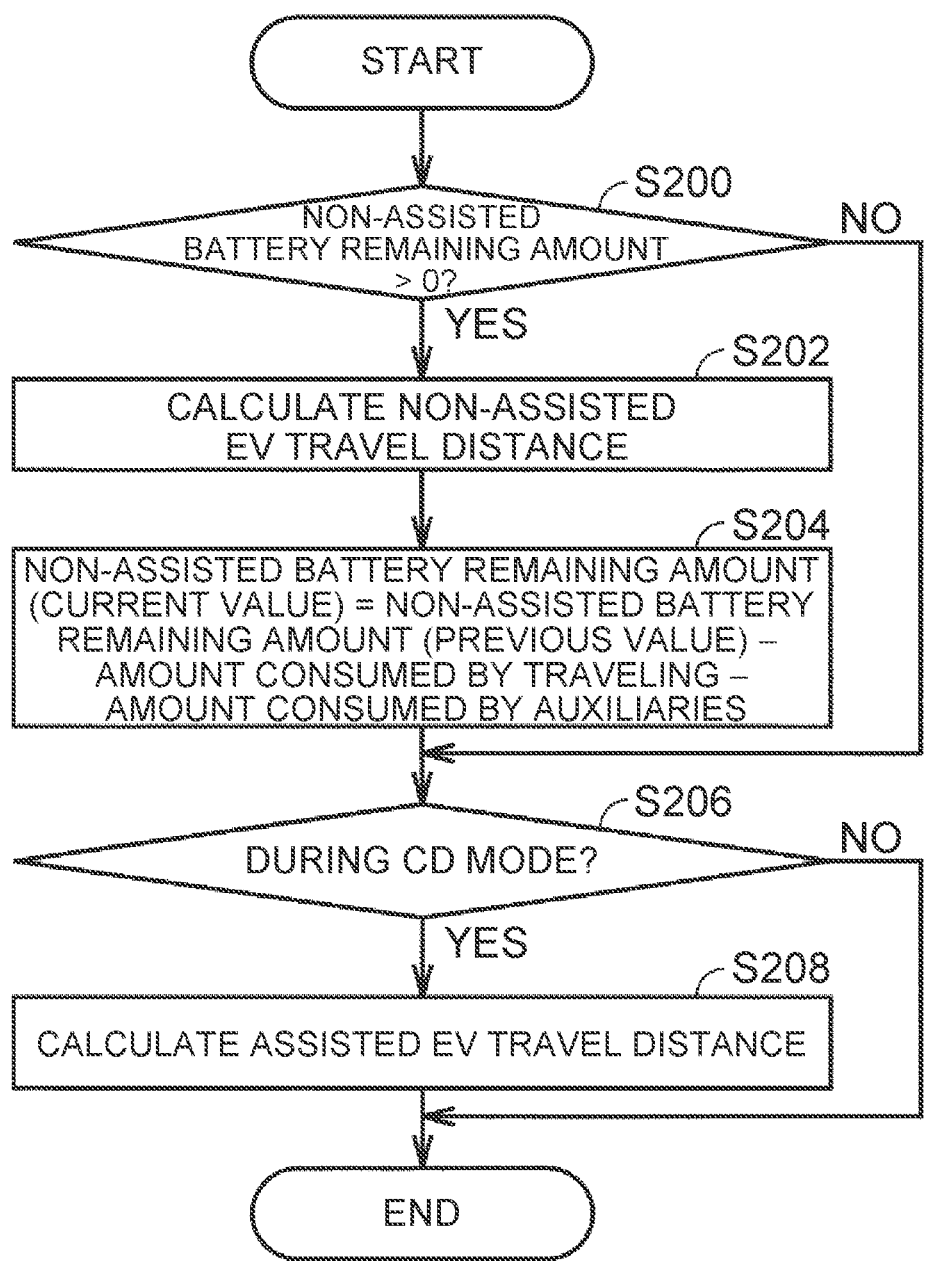
FIG. 5 is a flowchart showing an example of processing to calculate a non-assisted EV travel distance and an assisted EV travel distance.

Next, an example of the processing to calculate the non-assisted EV travel distance and the assisted EV travel distance implemented in the processing of S126 in FIG. 4 will be described in detail with reference to FIG. 5. FIG. 5 is a flowchart showing an example of the processing to calculate the non-assisted EV travel distance and the assisted EV travel distance.

In S200, the HV-ECU 300 determines whether or not the non-assisted battery remaining amount is greater than zero. When it is determined that the non-assisted battery remaining amount is greater than zero (YES in S200), the processing is shifted to S202. When it is determined that the non-assisted battery remaining amount is equal to or less than zero (NO in S200), the processing is shifted to S206.

In S202, the HV-ECU 300 calculates the non-assisted EV travel distance (present value). Specifically, the HV-ECU 300 calculates the non-assisted EV travel distance (present value) by adding a movement distance from the time of calculating the previous value to the non-assisted EV travel distance (previous value). The non-assisted EV travel distance (previous value) is the last calculated non-assisted EV travel distance, and its initial value is zero. The HV-ECU 300 calculates the movement distance from the time of previous calculation by using the time elapsed from the time of calculating the previous value and the vehicle speed. The HV-ECU 300 may use the current vehicle speed detected by the vehicle speed sensor to calculate the movement distance from the time of calculating the previous value, or may calculate the movement distance from the time of calculating the previous value by using an average vehicle speed value during the period from the time of calculating the previous value to the time of calculating the present value.

In S204, the HV-ECU 300 calculates the non-assisted battery remaining amount (present value). The HV-ECU 300 estimates, as the non-assisted battery remaining amount (present value), the battery remaining amount of the power storage device 100 after electric power is consumed by electric driving using the electric power of the power storage device 100 in the case where the switching control is not executed since the time of calculating the previous value.

Specifically, the HV-ECU 300 calculates the non-assisted battery remaining amount (present value) by subtracting from the non-assisted battery remaining amount (previous value) the amount of electric power corresponding to the amount consumed by traveling during the period from the time of calculating the previous value to the time of calculating the present value and the amount of electric power corresponding to the amount consumed by the auxiliaries during the period. The HV-ECU 300 uses the calculated non-assisted battery remaining amount (present time) to update the value of the non-assisted battery remaining amount stored in the memory 302.

For example, the HV-ECU 300 calculates the actual energy consumed in the second MG 12 (energy consumed by traveling) during the period from the time of calculating the previous value to the time of calculating the present value as the amount consumed by traveling. The HV-ECU 300 may calculate the energy consumed by traveling based on, for example, the current and voltage supplied to the second MG 12 as the amount consumed by traveling. The HV-ECU 300 calculates the energy consumed by traveling by defining a maximum value of the output energy from the second MG 12 as a maximum value of the energy consumed by traveling.

For example, the HV-ECU 300 calculates the actual energy consumed in the auxiliaries of the vehicle 1 (energy consumed by auxiliaries) during the period from the time of calculating the previous value to the time of calculating the present value as the amount consumed by auxiliaries. The auxiliaries of the vehicle 1 include, for example, at least one of the air conditioner 374, various cooling fans (for example, electrical devices such as a cooler for the power storage device 100), and various power converters such as DCDC converters. The HV-ECU 300 may calculate the energy consumed by auxiliaries based on, for example, the current and voltage supplied to the auxiliaries as the amount consumed by auxiliaries. The non-assisted battery remaining amount (previous value) is the last calculated non-assisted battery remaining amount. Once the non-assisted battery remaining amount (present value) is calculated, the HV-ECU 300 shifts the processing to S206.

In S206, the HV-ECU 300 determines whether or not the control mode is the CD mode. The HV-ECU 300 reads information about the set control mode from the memory 302, and uses the read information to determine whether or not the control mode is the CD mode. When it is determined that the control mode is the CD mode (YES in S206), the processing is shifted to S208. When it is determined that the control mode is not the CD mode (NO in S206), the processing is ended.

In S208, the HV-ECU 300 calculates the assisted EV travel distance (present value). Specifically, the HV-ECU 300 calculates the assisted EV travel distance (present value) by adding a movement distance from the time of calculating the previous value to the assisted EV travel distance (previous value). The assisted EV travel distance (previous value) is the last calculated assisted EV travel distance, and its initial value is zero. The HV-ECU 300 calculates the movement distance from the time of calculating the previous value by using the time elapsed from the time of calculating the previous value and the vehicle speed. Since the method for calculating the movement distance is as described above, the detailed description thereof is not repeated.

Description is given of the operation of the HV-ECU 300 mounted on the vehicle 1 in the present embodiment based on the structure and flowchart as described in the foregoing.

For example, when the control system of the vehicle 1 is started up by the start-up operation of the user, the IG flag is put in the ON state (YES in S100). Accordingly, the HV-ECU 300 determines whether or not there is an assist implementation history (S102). When the history flag is in the OFF state, and thereby it is determined that there is no assist implementation history (No in S102), the HV-ECU 300 determines whether or not the assist condition is established (S108).

When the destination and the travel route of the vehicle 1 are set, it is determined that the assist condition is established (YES in S108). Accordingly, the HV-ECU 300 determines whether the look-ahead information is updated (S110). When the navigation ECU 350 receives road traffic information and generates the look-ahead information corresponding to the set travel route, and the HV-ECU 300 receives the generated look-ahead information from the navigation ECU 350, the HV-ECU 300 determines that the look-ahead information is updated (YES in S110). As a result, the HV-ECU 300 calculates the energy consumption En in each of a plurality of travel sections that constitute the travel route based on the look-ahead information, and calculates the sum total of the energy consumption En as the total energy consumption Esum (S112).

When the total energy consumption Esum is greater than the remaining energy Er (YES in S114) even though there is no assist implementation history (i.e. the history flag is in the OFF state), the travel plan is generated (S116). In generation of the travel plan, first the CD mode is assigned to the CD mode priority sections, among a plurality of travel sections constituting the travel route. The CD mode is then allocated to the travel sections, out of the travel sections other than the CD mode priority section, in order of lower energy consumption until the total energy consumption in the travel sections allocated with the CD mode exceeds the remaining energy of the power storage device 100. Then, the CS mode is assigned to the travel sections not allocated with the CD mode.

Once the travel plan corresponding to the travel route having all the travel sections assigned with the control modes is generated, the HV-ECU 300 executes the switching control of the control modes in accordance with the travel plan (S118).

At this time, since there is no assist implementation history (YES in S120), the HV-ECU 300 sets the non-assisted battery remaining amount (S122), sets the history flag to the ON state (S124), and calculates the non-assisted EV travel distance and the assisted EV travel distance (S126).

In other words, when the non-assisted battery remaining amount is greater than zero (YES in S200), the HV-ECU 300 calculates the non-assisted EV travel distance (present value) by adding the movement distance since the time of calculating the previous value to the non-assisted EV travel distance (previous value (S202).

Then, the HV-ECU 300 calculates the non-assisted battery remaining amount (present value) by subtracting from the non-assisted battery remaining amount (previous value) the amount consumed by traveling and the amount consumed by auxiliaries since the time of calculating the previous value (S204).

In addition, when the CD mode is maintained as the control mode (YES on S206), the HV-ECU 300 calculates the assisted EV travel distance (present value) by adding the movement distance since the time of calculating the previous value to the assisted EV travel distance (previous value) (S208). As long as the control termination condition is not established, such as when the vehicle 1 has not yet reached the destination (NO in S128), the HV-ECU 300 continuously implements the switching control.

When the control termination condition is established (YES in S128) before the vehicle 1 reaches the destination, as in the case where the IG is turned off due to refueling or user breaks, the HV-ECU 300 ends the switching control (S130). In this case, the history flag is kept in the ON state because the control termination condition is established by IG-off before reaching the destination. Therefore, when the IG is subsequently turned on (YES in S100), it is determined that there is an assist implementation history (YES in S102). Accordingly, the HV-ECU 300 refers to the non-assisted EV travel distance before IG-off and the assisted EV travel distance before IG-off, and the non-assisted battery remaining amount before IG-off stored in the memory 302 (S104), and calculates the non-assisted EV travel distance, the assisted EV travel distance, and the non-assisted battery remaining amount (S106). In this case, when the non-assisted battery remaining amount is greater than zero, the HV-ECU 300 calculates the non-assisted EV travel distance by adding the movement distance after IG-on to the non-assisted EV travel distance before IG-off. Furthermore, the HV-ECU 300 calculates the assisted EV travel distance by adding the movement distance after IG-on to the assisted EV travel distance before IG-off. Accordingly, the non-assisted EV travel distance and the assisted EV distance are calculated by adding the travel distance, by electric traveling using the electric power of the power storage device 100 until the switching control is resumed after the IG is temporarily turned off and then turned on, to the non-assisted EV travel distance before IG-off and the assisted EV travel distance before IG-off, respectively.

After that, when the assist condition is established (YES in S108) and the look-ahead information is updated (YES in S110), the HV-ECU 300 calculates the non-assisted EV travel distance until the non-assisted battery remaining amount becomes equal to or less than zero, and also calculates the assisted EV travel distance (S126).

As described in the foregoing, in the hybrid vehicle according to the present embodiment, when the IG is temporarily turned off and then turned on while the switching control is in operation, the non-assisted EV travel distance and the assisted EV travel distance are calculated using the execution history (non-assisted EV travel distance before IG-off, non-assisted battery remaining amount before IG-off, and assisted EV travel distance before IG-off), and also at least the assisted EV travel distance is calculated by adding the travel distance by electric traveling with the engine 14 being in the stopped state during a period until the switching control is started after IG-on. Hence, it is possible to accurately calculate the non-assisted EV travel distance and the assisted EV travel distance. Therefore, it is possible to provide the hybrid vehicle that accurately calculates the travel distance by electric driving using electric power from an onboard battery in the case where switching control is executed according to the traveling situations and in the case where the switching control is not executed.

Hereinafter, modifications will be described.

In the embodiment, the vehicle 1 has been described, for example, as a series parallel hybrid vehicle. However, as long as the CD mode and the CS mode can be set, the vehicle 1 may be any hybrid vehicle, such as a series hybrid vehicle, other than the series parallel hybrid vehicle.

Furthermore, in the embodiment, the remaining energy Er has been described as the energy equivalent to the amount of electric power taken required the current SOC of the power storage device 100 to be within the prescribed range. However, the remaining energy Er may be obtained by adding a certain margin to that energy.

Furthermore, in the embodiment described in the foregoing, the HV-ECU 300 and the navigation ECU 350 each execute their prescribed processing, and exchange various information to operate in cooperation. However, a single ECU having the functions of the HV-ECU 300 and the functions of the navigation ECU 350 may execute the prescribed processing.

Furthermore, in the embodiment described in the foregoing, the information about switching control as shown in FIG. 2 has been described as being displayed on the HMI device 330. However, the information may be displayed on the display device of a mobile terminal owned by the user instead of or in addition to the HMI device 330.

Figure 6:
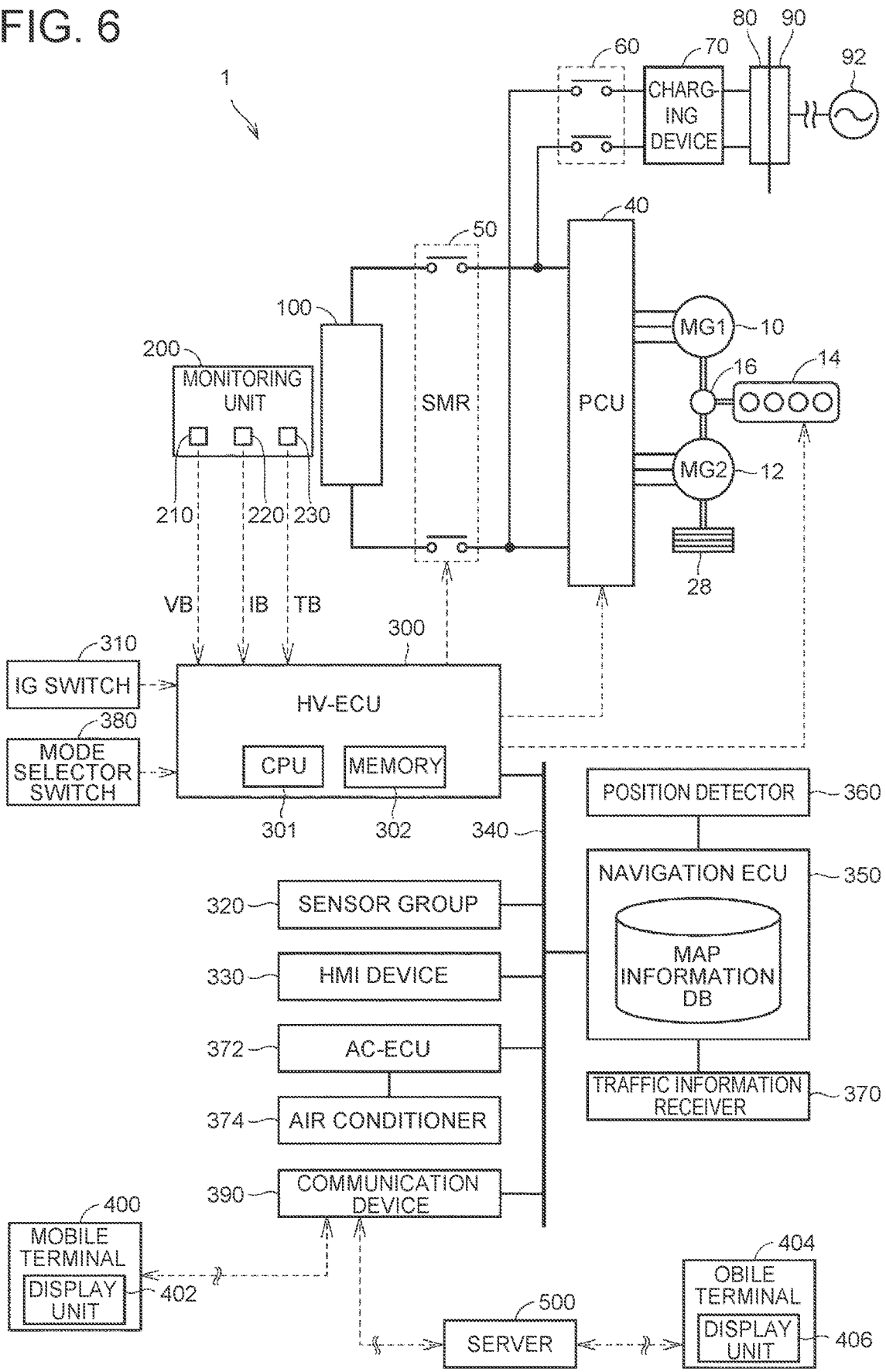
FIG. 6 shows an example of the configuration of a hybrid vehicle in a modification.

FIG. 6 shows an example of the configuration of a hybrid vehicle in a modification. The vehicle 1 shown in FIG. 6 is different from the vehicle 1 shown in FIG. 1 in that a communication device 390 is provided. The communication device 390 can communicate with at least one of a mobile terminal 400 owned by the user and a server 500 provided outside the vehicle 1. The configuration of the vehicle 1 shown in FIG. 6 is similar to the configuration of the vehicle 1 shown in FIG. 1 except for the communication device 390. Therefore, the detailed description is not repeated.

As shown in FIG. 6, the vehicle 1 further includes the communication device 390. The communication device 390 is configured to be communicable with at least one of the mobile terminal 400 owned by the user of the vehicle 1 and a mobile terminal 404 via the server 500 provided outside the vehicle 1.

The communication device 390 and the mobile terminal 400 may be connected so as to be communicable through prescribed near-range wireless communication by, for example, executing pairing processing in advance. The communication device 390 and the mobile terminal 400 may be connected so as to be communicable through wireless communication such as a wireless local area network (LAN) via a base station not illustrated. Alternatively, the communication device 390 and the mobile terminal 400 may be directly connected through wired connection.

The mobile terminal 400 is provided with a display unit 402. The display unit 402 is configured to be able to display information received from the communication device 390 in a prescribed format. The HV-ECU 300 may transmit information about the switching control to the mobile terminal 400 via the communication device 390. The mobile terminal 400 may display the information received from the communication device 390 on the display unit 402. This configuration also enables the user to recognize the information about the switching control, such as the effect of executing the switching control. When the HV-ECU 300 transmits the information about the switching control to the mobile terminal 400 via the communication device 390, the HV-ECU 300 may not display the information received from the communication device 390 on the HMI device 330.

The communication device 390 and the server 500 may also be connected so as to be communicable through, for example, wireless communication such as wireless LAN via a base station not illustrated. The server 500 and the mobile terminal 404 may also be connected so as to be communicable through, for example, wireless communication such as wireless LAN via a base station not illustrated.

The mobile terminal 404 is provided with a display unit 406. The display unit 406 is configured to be able to display information received from the communication device 390 via the server 500 in a prescribed format. The HV-ECU 300 may transmit information about the switching control to the mobile terminal 404 via the communication device 390 and the server 500. The mobile terminal 404 may display the information received from the server 500 on the display unit 406. This configuration also enable the user to recognize the information about the switching control, such as the effect of executing the switching control.

In the embodiment described in the foregoing, in the case where the control termination condition is established due to the IG being turned off before the vehicle 1 reaches the destination, and the switching control is ended, the non-assisted EV travel distance before IG-off, the assisted EV travel distance before IG-off, and the non-assisted battery remaining amount before IG-off are stored in the memory 302 while the history flag is kept in the ON state, and the travel distance by electric traveling until the switching control is restarted after the IG is turned on is added to both the travel distances so as to calculate the non-assisted EV travel distance and the assisted EV travel distance. However, the non-assisted EV travel distance and the assisted EV travel distance may be calculated as below.

Specifically, in the case where the control termination condition is established due to the switching control being temporarily interrupted before the vehicle 1 reaches the destination, and then the switching control returns from the interrupted state, the travel distance by the electric traveling in the period in the interrupted state and the travel distance by the electric traveling in the period until the switching control is restarted after the switching control is put in the interrupted state may be calculated, and the calculated travel distances may be added to calculate the assisted EV travel distance.

Figure 7:
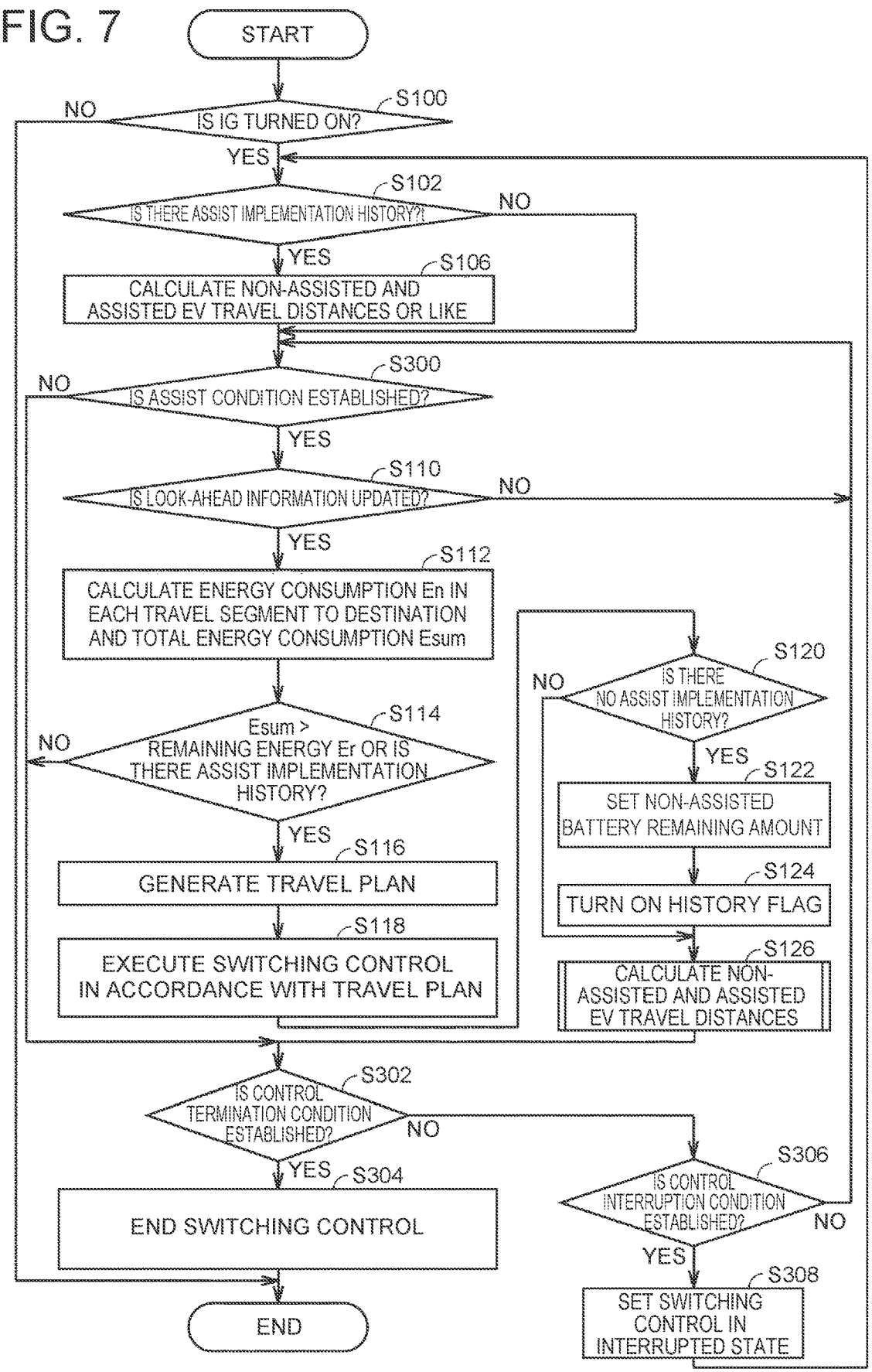
FIG. 7 is a flowchart showing an example of processing executed in the HV-ECU in the modification.

FIG. 7 is a flowchart showing an example of the processing executed in the HV-ECU 300 in a modification.

The processing shown in the flowchart in FIG. 7 is different from the processing shown in the flowchart in FIG. 4 in the following points. That is, the processing of S104 is omitted, processing of S300 is executed instead of the processing of S108, and processing of S302, processing of S304, processing of S306, and processing of S308 are executed in place of the processing of S128 and the processing of S130. The processing other than the above-stated processing are the same as that shown in the flowchart in FIG. 4 and designated by the same step number, unless otherwise described below. Therefore, the detailed description thereof is not repeated.

When it is determined that there is no assist implementation history (NO in S102), the processing is shifted to S300. Alternatively, when it is determined that there is an assist implementation history (YES in S102), and the non-assisted EV travel distance and the assisted EV travel distance are calculated (S106), the processing is shifted to S300.

In S300, the HV-ECU 300 determines whether or not the assist condition is established. Since the assist condition is as described above, the detailed description thereof is not repeated. When it is determined that the assist condition is established (YES in S300), the processing is shifted to S110. When it is determined that the assist condition is not established (NO in S300), the processing is shifted to S302. Alternatively, when the non-assisted EV travel distance and the assisted EV travel distance are calculated in S126, the processing is shifted to S302.

In S302, the HV-ECU 300 determines whether or not the control termination condition is established. Since the control termination condition is as described above, the detailed description thereof is not repeated. When it is determined that the control termination condition is established (YES in S302), the processing is shifted to S304. When it is determined that the control termination condition is not established (NO in S302), the processing is shifted to S306.

In S304, the HV-ECU 300 ends the switching control in accordance with the travel plan. For example, the HV-ECU 300 sets the history flag to the OFF state. In addition, the non-assisted EV travel distance and the assisted EV travel distance are reset to initial values after the information on the effects of executing the switching control shown in FIG. 2 is displayed on the HMI device 330, for example.

In S306, the HV-ECU 300 determines whether or not a control interruption condition is established. The control interruption condition includes, for example, a condition that at least one condition is established out of a condition that abnormal temperature of the power storage device 100 occurs, a condition that electric power of the power storage device 100 is depleted, a condition that the vehicle 1 is out of the travel route, and a condition that the engine 14 is started in the CD mode.

The HV-ECU 300 determines that the abnormal temperature has occurred in the power storage device 100 when, for example, the power storage device 100 is in the state of high temperature higher than a threshold. In addition, the HV-ECU 300 determines that electric power of the power storage device 100 is depleted when, for example, the SOC of the power storage device 100 is equal to or less than a threshold (for example, a value indicating a lower limit value of the SOC). In addition, the HV-ECU 300 determines that the vehicle 1 is out of the travel route when the current position of the vehicle 1 is moving on a route that is different from the set travel route (or a route distanced by a prescribed distance or more). In addition, the HV-ECU 300 determines that the engine 14 is started in the CD mode when the condition for starting the engine 14 is established (or when the engine speed is equal to or more than a threshold) during selection of the CD mode. The condition for starting the engine 14 may include, for example, a condition that the accelerator operation amount is equal to or more than a threshold.

When it is determined that the control interruption condition is established (YES in S306), the processing is shifted to S308. When it is determined that the control interruption condition is not established (NO in S306), the processing returns to S300.

In S308, the HV-ECU 300 sets the switching control to the interrupted state. In this case, the HV-ECU 300 continues to select the CD mode. When the information indicating that the switching control is in operation in accordance with the travel plan is being displayed on the HMI device 330, the HV-ECU 300 may put the HMI device in a non-display state. When the switching control is set to the interrupted state, the HV-ECU 300 returns the processing to S102.

Description is given of the operation of the HV-ECU 300 in the modification based on the structure and flowchart as described in the foregoing.

For example, when the control system of the vehicle 1 is started up by the start-up operation of the user, the IG flag is put in the ON state (YES in S100). Accordingly, the HV-ECU 300 determines whether or not there is an assist implementation history (S102). When the history flag is in the OFF state, and thereby it is determined that there is no assist implementation history (No in S102), then the HV-ECU 300 determines whether or not the assist condition is established (S300).

When the destination and the travel route of the vehicle 1 are set, it is determined that the assist condition is established (YES in S300). Accordingly, the HV-ECU 300 determines whether the look-ahead information is updated (S110). When the navigation ECU 350 receives road traffic information, and generates the look-ahead information corresponding to the set travel route, and the HV-ECU 300 receives the generated look-ahead information from the navigation ECU 350, the HV-ECU 300 determines that the look-ahead information is updated (YES in S110). As a result, the HV-ECU 300 calculates the energy consumption En in each of a plurality of travel sections that constitute the travel route based on the look-ahead information, and calculates the sum total of the energy consumption En as the total energy consumption Esum (S112).

When the total energy consumption Esum is greater than the remaining energy Er (YES in S114) even though there is no assist implementation history, the travel plan is generated (S116), and the switching control of the control modes is executed in accordance with the travel plan (S118).

At this time, since there is no assist implementation history (YES in S120), the HV-ECU 300 sets the non-assisted battery remaining amount (S122), sets the history flag to the ON state (S124), and calculates the non-assisted EV travel distance and the assisted EV travel distance (S126).

In other words, when the non-assisted battery remaining amount is greater than zero (YES in S200), the HV-ECU 300 calculates the non-assisted EV travel distance (present value) by adding the movement distance since the time of calculating the previous value to the non-assisted EV travel distance (previous value) (S202).

Then, the HV-ECU 300 calculates the non-assisted battery remaining amount (present value) by subtracting the amount consumed by traveling and the amount consumed by auxiliaries since the time of calculating the previous value from the non-assisted battery remaining amount (previous value) (S204).

In addition, when the CD mode is maintained as the control mode (YES on S206), the HV-ECU 300 calculates the assisted EV travel distance (present value) by adding the movement distance since the time of calculating the previous value to the assisted EV travel distance (previous value) (S208). When the control termination condition is not established, such as when the vehicle 1 does not yet reach the destination (NO in S128), the HV-ECU 300 continuously implement the switching control.

When the abnormal temperature occurs in the power storage device 100 before the vehicle reaches the destination (No in S302, YES in S306), the HV-ECU 300 sets the switching control to the interrupted state (S308). At this time, the information indicating that the switching control is in operation is not displayed on the HMI device 330. Meanwhile, since the history flag is kept in the ON state, it is determined that there is an assist implementation history (YES in S102). Therefore, during the period until the assist condition is established (No in S300), the non-assisted EV travel distance and the assisted EV travel distance are continuously calculated (S106). Once the abnormal temperature of the power storage device 100 is eliminated, the control interruption condition is no longer established (NO in S306), and the support condition is again established (YES in S300). Hence, the look-ahead information is updated (YES in S110), and the switching control is restarted (S118). In this case, since the non-assisted EV travel distance and the assisted EV travel distance are continuously calculated (S126), the travel distance by electric driving using the electric power of the power storage device 100 during the period that the switching control is interrupted, and the travel distance by electric drive using the electric power of the power storage device 100 during the period until the switching control is started after the control interruption condition is not established are added to calculate the non-assisted EV travel distance and the assisted EV travel distance, respectively.

Thus, after the switching control is returned from a temporarily interrupted state, the non-assisted EV travel distance and the assisted EV travel distance are calculated by using the execution history of the switching control, and also the travel distance by electric traveling with the engine 14 being in the stopped state during the period until the switching control is started after the switching control is returned is added to calculate at least the assisted EV travel distance. Hence, it is possible to accurately calculate the non-assisted EV travel distance and the assisted EV travel distance.

The above modifications may be carried out by combining all or some of their configuration aspects as appropriate.

It should be understood that the embodiment disclosed is in all respects illustrative and are not considered as the basis for restrictive interpretation. The scope of the present disclosure is defined not by the foregoing description but by the range of appended claims. All changes which come within the range of the claims and meaning and the range of equivalency thereof are therefore intended to be embraced therein.

What is claimed is:

1. A hybrid vehicle, comprising:
   an electric motor configured to generate drive force for the vehicle;
   a power storage device configured to supply electric power to the electric motor;
   an engine configured to generate electric power generated to charge the power storage device; and
   a controller configured to control the engine and the electric motor in accordance with one of a plurality of control modes, wherein:
   the control modes include a charge depleting (CD) mode and a charge sustaining (CS) mode;
   the controller is configured to
   execute switching control for switching the control modes in accordance with a travel plan by using external information acquired from outside of the vehicle after a predetermined condition is established, the travel plan including a travel route of the vehicle to a destination, the travel route including a plurality of sections each assigned with one of the CD mode and the CS mode,
   calculate, when there is an execution history of the switching control prior to establishment of the predetermined condition, a first travel distance and a second travel distance by using the execution history, the first travel distance being a distance by electric traveling using electric power from the power storage device with the engine being in a stopped state when the switching control is not executed, the second travel distance being a distance by the electric traveling with the engine being in the stopped state when the switching control is executed, and
   calculate the second travel distance by adding a travel distance by the electric traveling with the engine being in the stopped state during a period until the switching control is restarted after the predetermined condition is established.

2. The hybrid vehicle according to claim 1, wherein the predetermined condition includes a condition that a control system of the vehicle starts up.

3. The hybrid vehicle according to claim 1, wherein the predetermined condition includes a condition that the switching control is returned from a temporarily interrupted state.

4. The hybrid vehicle according to claim 3, wherein the controller is configured to put the switching control in the temporarily interrupted state, when the switching control is in operation in at least any one of cases including a case where an abnormal temperature occurs in the power storage device, a case where electric power in the power storage device is depleted, a case where the vehicle is out of the travel route, and a case where the engine is started up in the CD mode.

5. The hybrid vehicle according to claim 1, wherein the execution history includes information about the first travel distance and the second travel distance during a period before the predetermined condition is established.

6. The hybrid vehicle according to claim 1, further comprising at least one of a communication device configured to be communicable with an external mobile terminal and a notification device configured to notify predetermined information, wherein the controller notifies information about an effect of executing the switching control using at least one of the notification device and the mobile terminal via the communication device.

7. The hybrid vehicle according to claim 1, further comprising a communication device configured to be communicable with a mobile terminal via an external server, wherein the controller transmits information about an effect of executing the switching control to the mobile terminal.

8. The hybrid vehicle according to claim 1, wherein unless there is the execution history, the controller is configured not to execute processing to calculate the second travel distance by adding the travel distance by the electric driving with the engine in the stopped state during the period until the switching control is started after the predetermined condition is established.

* * * * *